United States Patent [19]

Hoyer-Ellefsen

[11] 4,002,889
[45] Jan. 11, 1977

[54] SELF-CLEANING LABEL FOR AUTOMATIC OBJECT IDENTIFICATION SYSTEM

[75] Inventor: Sigurd Hoyer-Ellefsen, Locus Valley, N.Y.

[73] Assignee: Servo Corporation of America, Hicksville, N.Y.

[22] Filed: Dec. 8, 1975

[21] Appl. No.: 638,560

[52] U.S. Cl. .................. 235/61.12 N; 340/146.3 K
[51] Int. Cl.² .................. G06K 19/06; G06K 9/00
[58] Field of Search ............ 235/61.12 R, 61.12 N, 235/61.11 E; 340/146.3 K

[56] References Cited
UNITED STATES PATENTS

| | | | |
|---|---|---|---|
| 3,443,072 | 5/1969 | Mori | 340/146.3 K |
| 3,502,851 | 3/1970 | Kakimoto et al. | 340/146.3 K |
| 3,754,212 | 8/1973 | Borsboom et al. | 340/146.3 K |

Primary Examiner—Daryl W. Cook
Attorney, Agent, or Firm—Kane, Dalsimer, Kane, Sullivan and Kurucz

[57] ABSTRACT

A self-cleaning label is provided for use in an automatic object identification system. The label comprises a backing member having a plurality of fins attached to it. A strip of reflective material is affixed to the front surface of each fin for "reading" by the components of the system. The fins are aerodynamically designed so that the flow of air past the label carrying surface serves to clean the surface and prevent the settling of dirt thereon.

6 Claims, 6 Drawing Figures

SELF-CLEANING LABEL FOR AUTOMATIC OBJECT IDENTIFICATION SYSTEM

BACKGROUND OF THE INVENTION

The present invention relates to object identification systems and in particular to an improved self-cleaning label for use in such systems.

In Pat. No. 3,225,177 which is commonly assigned with the present application, a system for the automatic identification of objects is disclosed. The commercial form of the invention is marketed under the trade name KARTRAK by the Servo Corporation of America of Hicksville, New York. The KARTRAK system is the American Association of Railroads' approved form of railroad car identification and, accordingly, virtually every freight car and locomotive in service in the United States and Canada is furnished with a KARTRAK label.

The label comprises a plurality of stripes formed of retroreflective material arranged in a two-position, base 4 code. At various sites, such as freight yards, terminals, etc. scanners are provided which, in effect, "read" the labels to decipher the alpha-numeric data identifying the cars. In this manner, automated surveillance can be maintained of the millions of railroad cars across the country.

The KARTRAK labels comprise a vertical array of modules of parallel, horizontal stripes, each module having two horizontal stripes. The fields are colored blue, orange, black (the absence of blue or orange) or white (the presence of both blue and orange). The modules are coded to contain information as to the car identification number, carry identification code and equipment code as well as control modules which generate a start signal, a stop signal and parity check code. The standard KARTRAK label contains 13 color-coded modules.

In addition to their use on railroad cars, the KARTRAK labels are also used on containers, truck trailers and the like. Indeed, such color-coded labels can be used in many other types of object identification systems. One of the principal advantages of the KARTRAK system is that the object may be moving while its label is being scanned and decoded.

One of the principal problems encountered with such labels is that with time and constant exposure to railroad track conditions the labels become dirty resulting in degradation of the reflected output signal. While the problem could obviously be solved if the label was subject to a regular cleaning program, this is not readily feasible. Heretofore, attempts have been made to electronically compensate for dirty labels during the label reading operation (see, for example, U.S. Pat. No. 3,502,888). This method also has its shortcomings in that sophisticated and hence expensive electronics and optics must be employed. In addition, if the label degrades beyond a certain point, it cannot be compensated for electronically.

In view of the above, it is the principal object of the present invention to provide an improved label particularly for use in identification systems of the type described in the aforereferenced U.S. Pat. No. 3,225,177.

A further object is to provide such a label which, through its construction, is self-cleaning so as to minimize the tendency of dirt to collect on the label stripes and hence prolong the useful life of the label.

SUMMARY OF THE INVENTION

The above and other beneficial objects and advantages are attained in accordance with the present invention by providing a label for use in an automatic object identification system comprising a backing member having a plurality of fins affixed thereto. Each of the fins has a rear surface directed toward the backing member and a front surface directed away from the backing member. Stripes of reflective material are affixed to the fin front surface and the fins are aerodynamically designed so that the flow of air past the fins serves to prevent the settling of particulate matter on the stripes.

DETAILED DESCRIPTION OF THE PREFERRED EMBODIMENT

Figure 1:
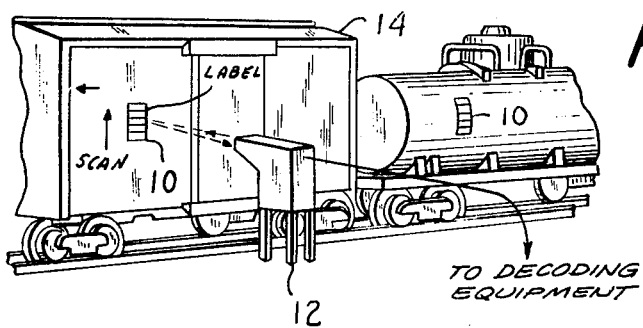
FIG. 1 is a diagrammatic representation of an automatic object identification system in accordance with the present invention.

As stated, the present invention comprises an improvement on the automatic identification system set forth in U.S. Pat. No. 3,225,177 and the details and disclosure of that patent are incorporated herein by reference. Suffice it to say, the basic system consists of three components: a label 10 which attaches to the object to be identified; a scanner 12 which "reads" the label; and, a decoder (not shown) which interprets the information from the scanner so as to provide useful information as to the identity of a railroad car 14 or other object passing before the scanner.

As discussed in detail in the above noted patent, the label 10 comprises an array of modules or fields of colored elements arranged in code to define data unique to the object. The AAR approved label is 10 inches wide by 22.5 inches high and contains 13 modules 16 arranged vertically one on top of the other and extending horizontally across the label. Each of the modules consists of two horizontal stripes 18 and 20 which may be colored blue, orange, white (blue and orange) or black (neither blue nor orange). The stripes are formed of a retroreflective material. In addition to carrying coded car identification information, each of the labels includes control information comprising a start signal module, a stop signal module, and a validity check module.

Scanner 12 is also discussed in detail in the above cited patent. Suffice it so say for the present application, the scanner contains a lamp and a rotating mirrored wheel which causes a light beam from the lamp to scan the label on a passing car vertically from bottom to top. Because of the retroreflective nature of the label modules, the reflected light is directed back from the label to the scanner where it is split by a dichroic mirror and passed through red and blue filters to impinge on photodetectors. The photodetectors generate a train of pulses which are subsequently fed to the decoding equipment for deciphering as to the identity of the passing car.

Figure 3:
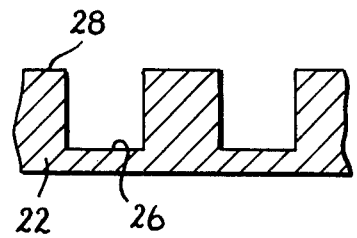
FIG. 3 is a fragmentary sectional view taken along reference lines 3—3 of FIG. 2.
Figure 2:
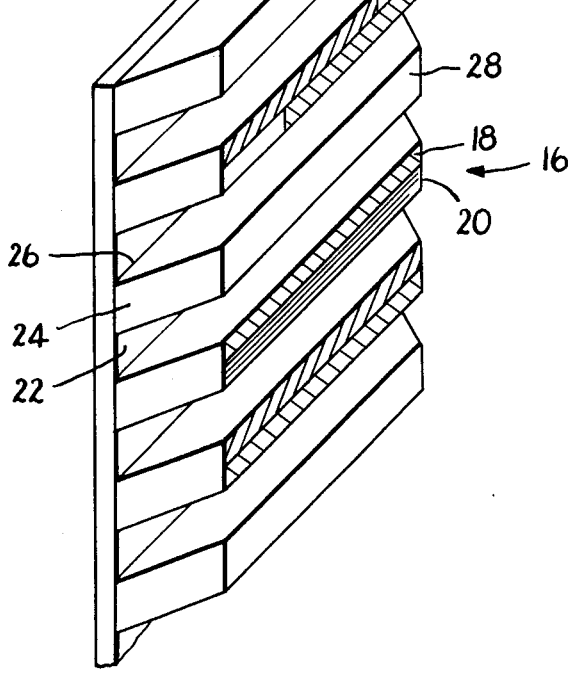
FIG. 2 is a perspective view of the improved label of the present invention.

In accordance with the present invention, the conventional flat label is replaced with a label as shown in FIG. 2. Label 10 comprises a base member 22 containing thereon a plurality of fins 24 each extending horizontally across the label. Each fin has a rear surface 26 affixed to the base member and a front surface 28. The stripes of retroreflective material 18 and 20 are mounted to the front surface as shown. Referring to FIG. 3, it can be seen that in section, the fins 24 resemble a square wave. As a result, as the label moves horizontally, the air at the base portion 22 between adjacent fins moves slower than the air at the forward portion of the fins. As a result, the air pressure between fins is higher than the pressure on the front surface of the fins resulting in turbulence which provides a "scrubbing" action on the forward surface of the fins containing the labels. This scrubbing action serves to remove dirt and prevent its accumulation and build-up.

Figure 5:
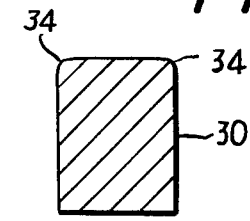
FIG. 5 is a sectional view taken along reference lines 5—5 of FIG. 4.
Figure 6:
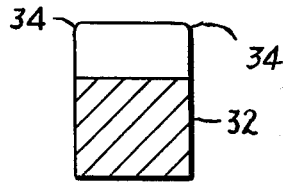
FIG. 6 is a sectional view taken along reference lines 6—6 of FIG. 4.
Figure 4:
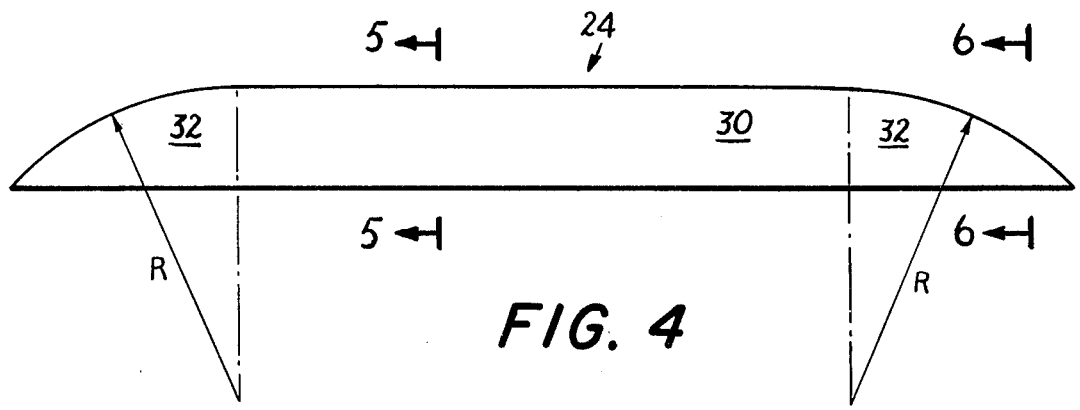
FIG. 4 is a plan view of an alternate embodiment of a label fin in accordance with the present invention.

In FIG. 4 a slight modification of the construction of fins 24 is shown. As depicted, the fin 24 is divided into a center portion 30 and side portions 32 on opposite sides of the center portion. The center portion is flat and extends horizontally across the backing member. The side portions are each curved along a radius extending from the base 22 to the center portion. The radius R provides an aerodynamic shape to increase the pressure differential between the base member 22 and front surface 28 to increase the turbulence and hence the scrubbing action. Similarly, the top and bottom edges 34 of the fins may be rounded to an aerodynamic shape along radius r as shown in FIGS. 5 and 6 to insure the scrubbing action on the front surface of the label.

The base members and fins may be molded in one piece of a plastic material. The retroreflective stripes may be mounted to the fins in a manner similar to that in which they are presently mounted to the current, flat base sheets, i.e., with a pressure sensitive adhesive.

In operation, as a railroad car moves along a track, the air pressure differential between the front surface of each fin and the base member between fins produces turbulence which results in the air scrubbing reflective stripes mounted to the front surface of each fin. In this manner, dirt and other particulate matter will be prevented from building up on the stripes and to some extent removed if permitted to build up. Thus, in accordance with the above, the aforementioned objects are effectively attained.

In a proposed commercial practice of the present invention, each fin center portion was 6 inches long and the side portions were each 2.25 inches. The side portions were curved on a radius of 3-1/32 inches and the edges were rounded off on radii of 1/16 inch. Each fin and the space in between fins was 0.8 inches wide and the fin extended 1 inch from the base member.

Having thus described the invention what is claimed is:

1. In an automatic object identification system of the type comprising a label made up of a backing member and a plurality of stripes of reflective material secured to said member, means for directing a beam of light on said stripes, and means for scanning the label to receive energy reflected from the individual stripes and generate an electrical system in response thereto the improvement comprising: a plurality of spaced apart protuding fins extending across said backing member, each of said fins having a rear surface directed toward said backing member and a front surface directed away from said backing member, said stripes of reflective material being affixed to said fins whereby the flow of air past said fins serves to prevent the settling of particulate matter on said stripes.

2. The invention in accordance with claim 1 wherein said backing member is integral with said fins.

3. The invention in accordance with claim 1 wherein each of said fins is generally rectangular in section.

4. The invention in accordance with claim 3 wherein each of said fins includes a top and bottom edge and each of said edges is rounded to an aerodynamic shape.

5. The invention in accordance with claim 1 wherein each of said fins includes a center portion and side portions extending gradually between said backing member and center portion on opposite sides of said center portion.

6. The invention in accordance with claim 5 wherein said side portions are rounded to an aerodynamic shape.

* * * * *